United States Patent

[11] 3,582,131

| [72] | Inventor | Alan J. Brown<br>20 Torbolton Drive, Apt. 8, Rexdale,<br>Ontario, Canada |
|---|---|---|
| [21] | Appl. No. | 809,229 |
| [22] | Filed | Mar. 21, 1969 |
| [45] | Patented | June 1, 1971 |

[54] COLLAPSIBLE TRAILER
11 Claims, 11 Drawing Figs.

[52] U.S. Cl. ..................................................... 296/27, 52/66
[51] Int. Cl. ...................................................... B60p 3/34
[50] Field of Search .......................................... 296/23, 26, 27, 23.3; 52/66

[56] References Cited
UNITED STATES PATENTS

| 3,050,331 | 8/1962 | Mansen | 296/23 |
| 3,456,978 | 7/1969 | Daniels | 296/23 |

FOREIGN PATENTS

| 866,281 | 4/1961 | Great Britain | 296/23.6 |

Primary Examiner—Philip Goodman
Attorney—Westell & Hanley

ABSTRACT: A rigid walled, collapsible trailer housing in which the sidewalls fold inwardly to lower the roof to meet a base portion, the assembly being sectioned along a transverse vertical plane for the further folding of one section to overlie the other section.

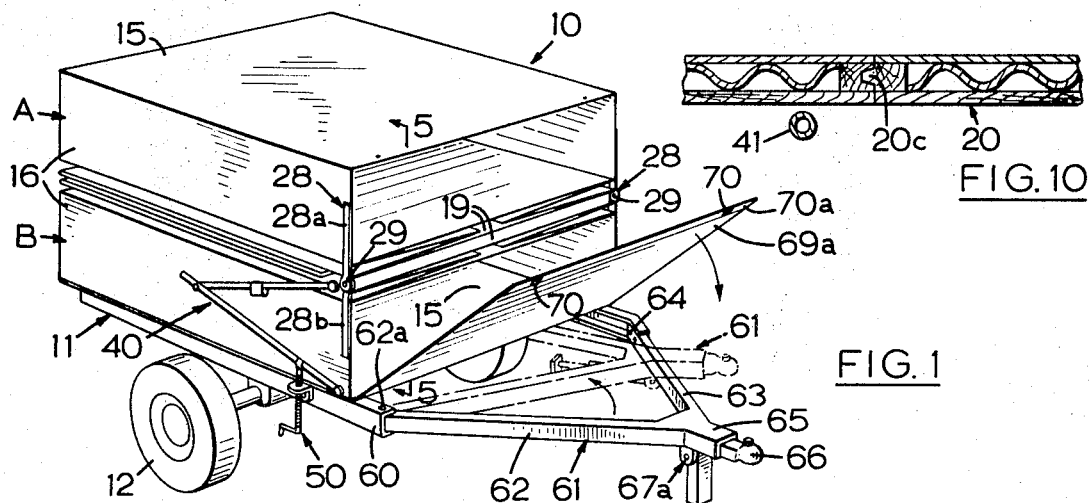
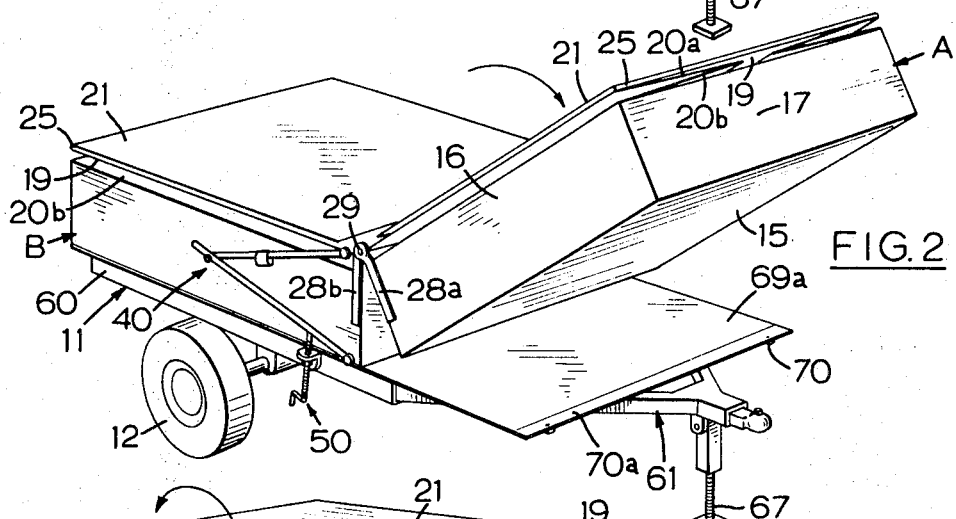
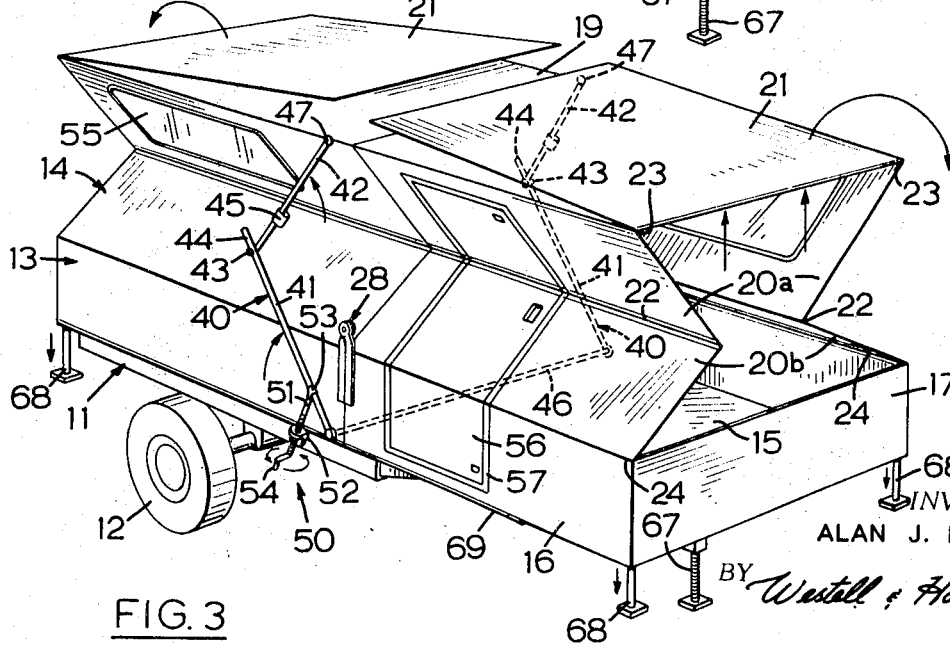
INVENTOR.
ALAN J. BROWN
BY Westall & Hanley

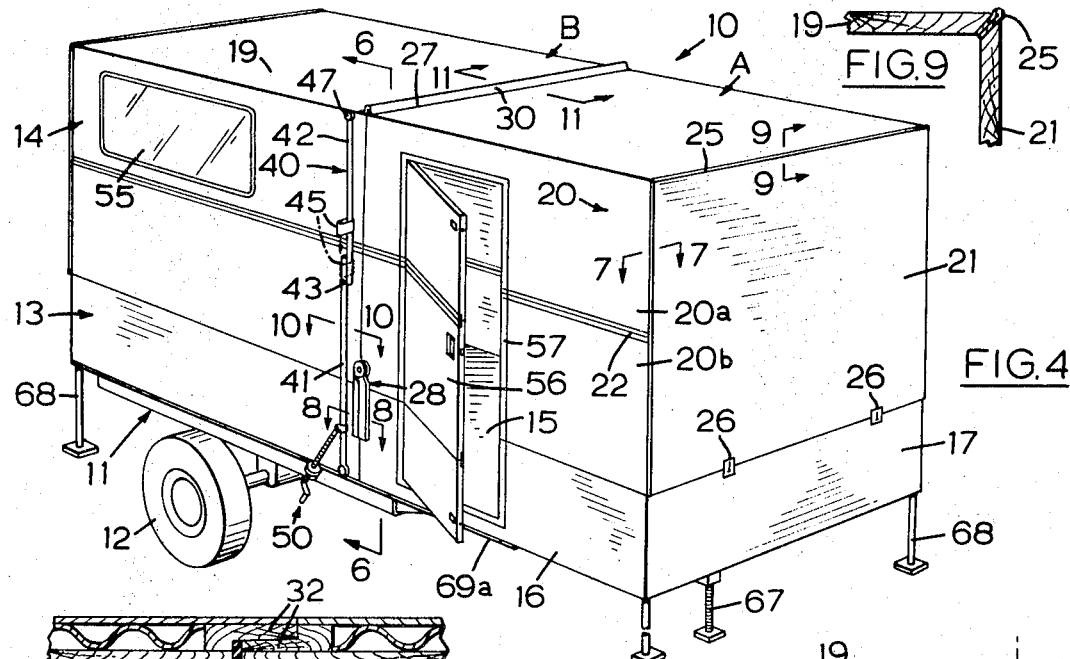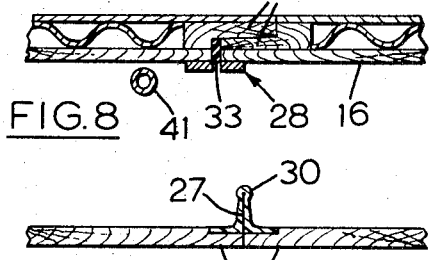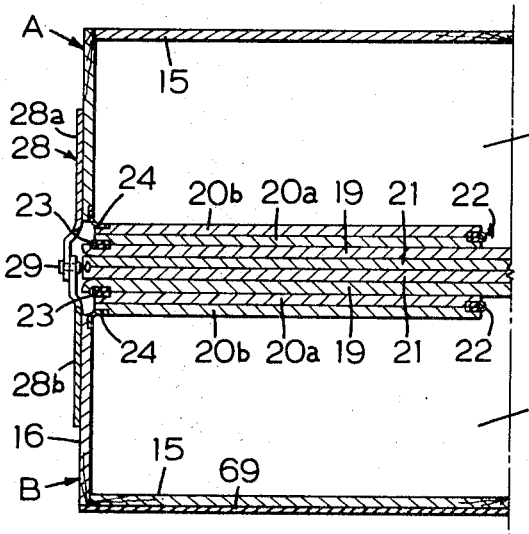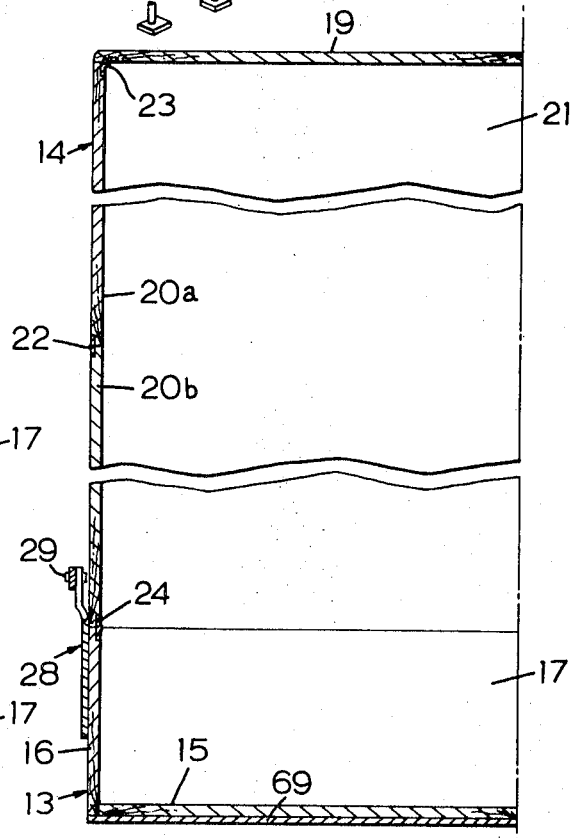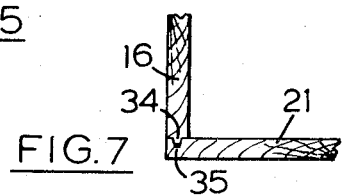

COLLAPSIBLE TRAILER

The present invention relates to a trailer and more particularly to a rigid walled, enclosed trailer, such as a house trailer, which is collapsible.

Rigidly constructed house trailers now generally in use are bulky and inconvenient to haul, and they require a large space for storage when not in use. To meet these problems, folding or otherwise collapsible rigid walled trailers have been developed which reduce either the height or the length of the housing but not both.

It is an object of the present invention to provide a collapsible, rigid walled trailer housing of simplified construction which is reducible both in height and in length.

An example embodiment of the invention is shown in the accompanying drawings in which:

FIG. 1 shows a trailer in perspective, with the housing diagrammatically shown collapsed for storage or transportation;

FIG. 2 shows the trailer of FIG. 1 but commencing the first main step in erecting the housing;

FIG. 3 shows the trailer of FIGS. 1 and 2 but commencing the second main step in the erection of the housing;

FIG. 4 shows the trailer of FIG. 1 with the housing completely erected for use;

FIG. 5 is a cross-sectional view of the collapsed housing taken along the line 5-5 of FIG. 1;

FIG. 6 is a cross-sectional view of the erected housing taken along the line 6-6 of FIG. 4;

FIG. 7 is a fragmentary cross-sectional view of a side corner of the erected housing taken along the line 7-7 of FIG. 4;

FIG. 8 is a fragmentary cross-sectional view of the sidewall of the housing taken along the line 8-8 of FIG. 4;

FIG. 9 is a fragmentary cross-sectional view of the roof edge of the erected housing taken along the line 9-9 of FIG. 4;

FIG. 10 (located on the same sheet as FIG. 1) is a fragmentary cross-sectional view taken along the line 10-10 of FIG. 4; and FIG. 11 is a fragmentary cross-sectional view taken along the line 11-11 of FIG. 4.

As seen best in FIG. 4 of the drawings, the illustrated embodiment consists of a trailer housing 10 mounted on a chassis 11 which carries a pair of journaled running wheels 12. Housing 10 consists of a rigid base 13 and an upper collapsible superstructure 14. Base 13 comprises a floor 15, opposed upright sidewalls 16, and opposed upright end walls 17 forming a rigid, rectangular box construction. Collapsible superstructure 14 comprises a flat, rectangular roof 19, opposed side panels 20, and opposed end panels 21. Side panels 20 are each divided into two equal, horizontal parts, an upper panel 20a and a lower panel 20b, which are connected together by a strip hinge 22 fixed on their outside surfaces and joining their contiguous edges. The upper edge of upper panel 20a is connected with the lateral edge of roof 19 by a strip hinge 23 fixed on their inside surfaces. The lower edge of lower panel 20b is connected with the upper edge of sidewall 16 of base 13 by a strip hinge 24 fixed on their inside surfaces. Each end panel 21 is connected with an end edge of roof 19 by a strip hinge 25 fixed to their inside surfaces as seen in FIG. 9, and the edge of each end panel opposite hinge 25 carries latches 26. The location of hinges 22, 23, 24 and 25 allows collapsible superstructure 14 of housing 10 to fold in the manner shown in FIG. 3 of the drawings.

Housing 10 is cut into two independent and separable halves along a transverse vertical plane 27 to form a front portion A and a rear portion B. The two separate housing portions A and B are joined by a pair of hinges 28, one fixed on each sidewall 16 of base portion 13 in a manner such that portion A is foldable to overlay portion B, as seen especially in FIGS. 1 and 2 of the drawings. A pair of parallel arms 28a and 28b of each hinge 28 are fixed, parallel to one another, to portions A and B respectively and are pivotally joined by a pin 29 of the hinge, the arms being aligned when portion A rests on portion B as seen in FIG. 1. Pins 29 of hinges 28 are coaxial. Roof 19 is hinged at its line of separation by a strip hinge 30, fixed on its outside surface. Hinge 30 is constructed to allow the front and rear sections of roof 19 to be laterally separable when the sections are folded one over the other in order to accommodate end panels 21 between them (see FIG. 5 of the drawings) but preventing the front roof section from unfolding more than 180° about the rear roof section, i.e. maintaining the two sections of the roof in alignment in a horizontal plane when unfolded as in FIG. 11 of the drawings. Side panels 20a and 20b are detailed together along their vertical lines of separation by a tongue and groove arrangement 20c as seen in FIG. 10 of the drawings. The separated sections of sidewalls 16 are dovetailed together by means of a pair of overlapping flanges 32, the edge of one flange abutting a sealing strip 33 as shown in FIG. 8 of the drawings. Each side panel carries a tongue 34 along its vertical end edge, which fits into a vertical groove 35 located on the inside surface of each end panel 21 adjacent the vertical side edges of the end panel, as seen in FIG. 7 of the drawings.

A pair of articulated braces 40 lie one on each side of the rear portion B of housing 10 adjacent plane 27. Each brace 40 consists of a lower arm 41 and an upper arm 42, the lower free end of arm 42 being pivotably joined adjacent the upper free end of arm 41 by a lateral pin 43 leaving a projection 44 of arm 41 extending beyond the pin. A ferrule 45 carried by upper arm 42 is movable longitudinally of that arm to engage projection 44 of lower arm 41 when arms 41 and 42 are in alignment. The lower ends of arms 41 are fixed to a torsion bar 46 which is laterally mounted beneath base 13 and is rotatable about its longitudinal axis. The upper ends of arms 42 are pivotably fixed by a pair of lateral coaxial pins 47 to the lateral edges of roof 19.

A jack 50 interconnects chassis 11 and brace 40 to articulate the brace about the common axis of pins 43 into, and out of, a vertical planar position. Jack 50 consists of a threaded rod 51 engaged by an apertured boss or flange 52 which is pivotably mounted on the side of frame 11 (or sidewall 16 of base 13 is preferred) to be freely movable in a vertical plane. Rod 51 is pivotally connected at one end to a collar 53 fixed on arm 41 intermediate its ends, while the other end of the rod carries a crank handle 54. Reducing gears (not shown) may be associated with jack 50 if desired.

Suitable windows 55 may be located in upper or lower side panels 20a or 20b, or in end panels 21. A hinged door 56, in hinged horizontal sections corresponding to upper and lower side panels 20a and 20b and sidewall 16, together with a door frame 47 may be fitted in the side of housing 10. Again, door 56 may be located in end wall 17 and end flap 21 of housing 10.

Chassis 11 includes a pair of parallel side channel members 60 on which rear portion B of housing 10 rests. The front ends of side channels 60 of chassis 11 carry a yoke 61, the end of one arm 62 of the yoke being pivotally mounted on its associated chain member by a vertical pin 62a and the end of the other arm 63 of the yoke being releasably secured to its associated channel member by removable bolts 64. Neck 65 of yoke 61 carries a suitable hitch member 66 and an extensible supporting leg 67 which is pivotally mounted on the neck of the yoke by a pin and bracket assembly 67a for movement out of its vertical position into a storage position, suitable catches (not shown) being employed to hold the leg releasably in either position. Base 13 of housing 10 also carries retractable supporting legs 68 at each of its corners. A support panel 69 underlies base 13 of housing 10 and rests on chassis 11, the forward section 69a of the support panel being hinged along the line of plane 27 and foldable upwardly to cover the exposed open ends of portions A and B when the latter is folded to overlay the former, the folded portion of the support panel being suitably fastened, as by snap fasteners 70 mounted on a hinged end flap 70a, to the upwardly facing section of floor 15 as seen in FIG. 1 of the drawings.

In the folded position of storage of the device, front portion A of housing 10 is folded over, and rests on, rear portion B as shown in FIGS. 1 and 5 of the drawings. If necessary, the length of chassis 11 can be reduced by removing bolts 64 from arm 63 of yoke 61 and swinging the yoke about pin 62a into a retracted position as shown by phantom lines in FIG. 1 of the drawings. In the folded position of housing 10, end panels 21 lie face to face in contiguous relationship with the two sections of roof 19 overlaying the end panels, side panels 20a overlaying the roof sections, and side panels 20b overlaying panels 20a, as seen in FIG. 5 of the drawings.

To transport the trailer, yoke 61 is swung outwardly and locked in its outer position by bolts 64, while supporting leg 67 is swung upwardly about pivot assembly 67a and latched in position. To erect housing 10 after the trailer is unhitched, leg 67 is swung downwardly about pivot assembly 67a into the position shown in FIG. 1 of the drawings and adjusted to level chassis 11. Fasteners 70 of supporting panel 69 is then released and the panel section 69a swung downwardly to rest on yoke 61. Next, front portion A of the collapsed housing is swung upwardly and forwardly about pins 29 of hinges 28 as shown in FIG. 2, until bottom 15 of the front portion rests on front section 69a of support panel 69 and the sections of sides 16 dovetail as seen in FIG. 8 and the sections of panels 20 dovetail as seen in FIG. 10. In the next step, crank 54 is rotated to advance threaded rod 51 in flange 52 and pivot arms 41 of brace 40 upwardly in unison through torsion bar 46 into an upright position and into alignment with arms 42. As arms 41 are raised, roof 19 moves upwardly and side panels 20 unfold outwardly as seen in FIG. 3. As mentioned previously, the sections of roof 19 are maintained rigidly in a horizontal plane, by the interaction of hinge 30 and the roof sections, to allow side panels 20 of forward portion A and rear portion B of housing 10 to unfold in unison. When arms 41 and 42 have been brought into alignment, ferrule 45 is dropped down over projection 44 of arm 41 as indicated by phantom lines in FIG. 4 of the drawings. With collar 45 holding brace 40 in vertical planar position, side panels 20 are held rigidly in vertical planes on each side of housing 10. End panels 21 are then folded upwardly, outwardly and downwardly as seen in FIG. 3 of the drawings and are latched to end walls 17 of base 13.

To collapse the trailer, the above steps are reversed. Door 56 must first be closed and end panels 21 unlatched. Collar 45 is raised to clear projection 44 of arm 41 and crank 54 is rotated to pivot arms 41 downwardly, causing side panels 20 to fold inwardly about hinges 22, 23 and 24 to a position underlying roof 19 which is lowered. At some point during this folding operation, end panels 21 are folded about hinges 25 to overlie roof 19, and legs 68 are retracted. Finally, front portion A of housing 10 is folded over portion B of the housing and the front section 69a end flap 69 is folded upwardly and fastened by fasteners 70.

It will be appreciated that the illustrated embodiment may be modified in a number of ways while retaining the concept of the invention. Thus end panels 21 may be hinged on roof 19 to underlie the roof when in folded position, rather than overlaying the roof, and this would require a modification of hinge 23 to allow adequate separation between the roof and upper side panels 20a as previously described with respect to hinge 30. As a further embodiment, end panels 21 may be hinged at their lower ends to the upper edges of end walls 17 of base 13.

Of course housing 10 could be mounted for transportation on means other than a separate trailer frame; for instance the housing may be carried on the rear portion of a pickup truck in the manner now used with trailer housings. Also, housing 10 can take other than rectangular form, as long as the sides of the housing are in parallel relationship to enable the housing to be folded and unfolded. The end walls of the housing may be modified or omitted to suit particular purposes.

I claim:

1. A collapsible rigid walled housing for use with a vehicle, comprising:
   a base having a floor and parallel, opposed sidewalls;
   a substantially flat roof movable between a raised and a lowered horizontal position;
   sidewall panels longitudinally hinged to opposed walls of the base and the roof;
   means interconnecting the roof and the base to raise and lower the roof whereby when the roof is lowered the side panels are foldable inwardly to a position underlying the roof and when the roof is raised the side panels are unfoldable outwardly into a vertical plane, said means being adapted to maintain the housing rigid when the roof is in raised position;
   the base, sidewalls and roof of the housing being divided in a vertical transverse plane into two separable sections, said two sections being interconnected by a first and a second hinge one fixed on each side of the housing to the contiguous sections of the sidewalls and the contiguous sections of the roof being interconnected by a third hinge adapted to maintain the roof sections in horizontal coplanar position as the roof is raised and lowered, the pivotal axes of the first and second hinges being coaxial one with the other, and being coaxial with the pivotal axis of the third hinge when the roof is in a lowered position, the two separable sections being foldable 180° about the third hinge whereby when the roof is in lowered position one of the sections is pivotable about the third hinge to a position overlaying the other section.

2. A housing as claimed in claim 1 in which the base is rectangular and includes end walls, end panels overlaying the roof and hinged thereto, the end panels being foldable downwardly and engageable with the end walls of the base, when the roof is in raised position, to form end walls of the housing.

3. A housing as claimed in claim 1 in which the means to raise and lower the roof, and to maintain the housing rigid, comprises a pair of articulated braces, one located on each side of the housing, each brace comprising upper and lower arms, the lower arms of the braces being pivotally mounted at their free ends to the base and the upper arms being mounted at their free ends to the roof, means to move the arms of each brace into and out of alignment and releasable means adapted to hold the arms of each brace in rigid vertical alignment.

4. A housing as claimed in claim 3 in which the lower arms are fixed at their free ends to a torsion bar mounted transversely on said housing, the torsion bar being rotatable about the longitudinal axis thereof.

5. A housing as claimed in claim 4 including crank means interconnecting the base of the housing and the lower arm of one of the braces, the crank means being adapted to pivot said lower arm about the axis of the torsion bar whereby the roof of the housing is raised and lowered.

6. A housing as claimed in claim 5 in which the crank means comprises a rod threaded in an apertured flange which is pivotably mounted on the base, one end of the rod being pivotally connected to said lower arm and the other end of the rod carrying a crank handle.

7. A housing as claimed in claim 1 including a chassis having running wheels journaled thereon and a forwardly extending hitch, the housing carrying a plurality of downwardly extensible supporting legs.

8. A housing as claimed in claim 1 including an end panel hinged to the floor of the base along the vertical transverse plane of separation and pivotable to cover the transverse openings of the sectioned base portion when said sections are in folded position one over the other.

9. A housing as claimed in claim 6 in which the forwardly extending hitch is retractable beneath the housing when in folded position.

10. A housing as claimed in claim 1 in which the two separable sections of the housing are interconnected by a first and second hinge one fixed on each side of the housing to the contiguous sections of the sidewalls, and the contiguous sections of the roof are interconnected to a third hinge, The pivotal axes of the first and second hinges being coaxial one with another, and being coaxial with the pivotal axis of the third hinge when the housing is in a folded position, the roof sections being unfoldable 180° about the third hinge whereby the roof sections are maintained in horizontal coplanar position as the roof is raised and lowered.

11. A collapsible rigid walled housing for use with a vehicle, comprising:

a base having a floor and parallel, opposed sidewalls;

a substantially flat roof movable between a raised and a lowered horizontal position;

sidewall panels longitudinally hinged to opposed walls of the base and to the roof;

means interconnecting the roof and the base to raise and lower the roof whereby when the roof is lowered to the side panels are foldable inwardly to a position underlying the roof and when the roof is raised the side panels are foldable outwardly in a vertical plane, said means being adapted to maintain the housing rigid when the roof is in raised position and comprising a pair of articulated braces, one located on each side of the housing, each brace comprising upper and lower arms the lower arms of the braces being pivotally mounted at their free ends to a torsion bar mounted transversely on the base of said housing, the torsion bar being rotatable about the longitudinal axis thereof, the upper arms of the braces being mounted at their free ends to the roof, means to move the arms of each brace into and out of alignment and releasable means adapted to hold the arms of each brace in rigid vertical alignment;

the base, sidewalls and roof of the housing being divided in a vertical transverse plane into two separable hinged sections, the sections of the base being hinged one to the other whereby one of said sections is pivotable about the horizontal axis to a folded position overlying the other section when the roof is in lowered position.